US010802980B1

United States Patent
Shugaeva et al.

(10) Patent No.: US 10,802,980 B1
(45) Date of Patent: Oct. 13, 2020

(54) CACHING ASSETS IN A MULTIPLE CACHE SYSTEM

(71) Applicant: CLOUDFLARE, INC., San Francisco, CA (US)

(72) Inventors: Samantha Aki Shugaeva, Palo Alto, CA (US); Ivan Babrou, San Francisco, CA (US); Yuchen Wu, Pacifica, CA (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 16/825,979

(22) Filed: Mar. 20, 2020

(51) Int. Cl.
| G06F 12/0897 | (2016.01) |
| G06F 12/0891 | (2016.01) |
| G06F 12/02 | (2006.01) |
| H04L 29/08 | (2006.01) |
| H04L 12/841 | (2013.01) |
| G06F 9/30 | (2018.01) |

(52) U.S. Cl.
CPC ...... *G06F 12/0891* (2013.01); *G06F 9/30047* (2013.01); *G06F 12/0246* (2013.01); *H04L 47/286* (2013.01); *H04L 67/1097* (2013.01); *G06F 12/0897* (2013.01); *G06F 2212/1021* (2013.01)

(58) Field of Classification Search
None
See application file for complete search history.

(56) References Cited

U.S. PATENT DOCUMENTS

| 7,478,197 B2 * | 1/2009 | Shen | G06F 12/0811 |
| | | | 711/117 |
| 8,966,181 B2 * | 2/2015 | Chen | G06F 12/0897 |
| | | | 711/122 |
| 9,053,010 B2 * | 6/2015 | Shiwalkar | G06F 12/0246 |
| 2014/0068181 A1 * | 3/2014 | Mridha | G06F 12/0871 |
| | | | 711/114 |
| 2017/0083447 A1 * | 3/2017 | Xu | G06F 12/0868 |

OTHER PUBLICATIONS

Thrash Detection-Based File Cache Sizing, GitHub, Inc., Apr. 3, 2014, 12 pages, downloaded at: https://github.com/torvalds/linux/commit/a528910e12ec7ee203095eb1711468a66b9b60b0.

(Continued)

*Primary Examiner* — Brian R Peugh
(74) *Attorney, Agent, or Firm* — Nicholson De Vos Webster & Elliott LLP

(57) ABSTRACT

A computing device includes a volatile memory that includes a first cache, a non-volatile storage that includes a second cache, and a cache service. The cache service, responsive to a cache miss, retrieves that asset and writes that asset to the first cache and not the second cache. The cache service reads the asset from the first cache responsive to requests for the asset until the asset is evicted from the first cache or until the asset is promoted to the second cache. The cache service promotes the asset to the second cache upon determining that a set of one or more criteria are satisfied including a predefined number of cache hits for the asset when it is in the first cache. The cache service reads the asset from the second cache responsive to requests for the asset until the asset is evicted from the second cache.

22 Claims, 10 Drawing Sheets

(56) References Cited

OTHER PUBLICATIONS

Wu et al., Reducing SSD Read Latency via NAND Flash Program and Erase Suspension, FAST'12: Proceedings of the 10th USENIX conference on File and Storage Technologies, Feb. 2012, 11 pages.
Memcached—A Distributed Memory Object Caching System, Caching beyond RAM: the case for NVMe—Dormando, Jun. 12, 2018, 7 pages, downloaded at: https://memcached.org/blog/nvm-caching/.
Robert Love, "Linux Kernel Development, Third Edition", chapter 16, The Page Cache and Page Writeback, released Jun. 2010, pp. 323-335.
Rao et al., Cloudflare's Gen X: Servers for an Accelerated Future, The Cloudflare Blog, Feb. 24, 2020, 9 pages, downloaded at: https://blog.cloudflare.com/cloudflares-gen-x-servers-for-an-accelerated-future/.
Ka-Hing Cheung, How we scaled nginx and saved the world 54 years every day, The Cloudflare Blog, Jul. 31, 2018, 9 pages, downloaded at:https://blog.cloudflare.com/how-we-scaled-nginx-and-saved-the-world-54-years-every-day/.
Maggs et al., Algorithmic Nuggets in Content Delivery, ACM SIGCOMM Computer Communication Review, vol. 45, No. 3, Jul. 2015, pp. 52-66.

* cited by examiner

CACHING ASSETS IN A MULTIPLE CACHE SYSTEM

FIELD

Embodiments of the invention relate to the field of caching; and more specifically, to the caching of assets in a multiple cache system.

BACKGROUND

Caching assets is very common in computing. Many operating systems use a disk cache in memory to access popular data. For instance, in Linux, the disk cache is referred to as a page cache that uses the system's available memory to cache reads and buffer writes to durable storage (e.g., SSD, HDD, etc.). Data that is frequently used is cached in memory to speed up reads by reducing the number of accesses to slower durable storage. A least recently used (LRU) algorithm may be used when deciding what to keep in page cache. Thus, popular data is typically cached in memory. Caching popular assets in a faster form of storage (e.g., page cache in memory) reduces overall information retrieval latency (cache hits occur more frequently when the cached assets are popular).

An asset that is cached but is never or very rarely read again (at least until after that asset is evicted from the cache) is sometimes referred to as a "one-hit-wonder." Even though these assets are not read or very rarely read again, they will likely evict a different asset based on an LRU or other cache eviction policy. As an example, in a content delivery network (CDN), a one-hit-wonder may be a file (e.g., an image, video, binary, etc.) that is requested by a single requester (client device) and not accessed again before it is evicted.

There are techniques for addressing the "one-hit-wonder" problem where the asset is not cached responsive to its first cache miss, but it is instead cached after its second cache miss or more depending on implementation. The signature of the asset can be put in memory for the caching system to remember it has encountered the asset. If the asset is encountered repeatedly, it will be cached. This means that the asset must be missed at least twice before it will be cached. Missing the asset twice of course requires that the asset be retrieved twice. If the asset is remote (e.g., it is a network asset), bandwidth and other network and compute resources are multiplied by the number of times the asset must be retrieved.

A cache may be backed by a disk such as a solid-state drive (SSD) or hard disk drive (HDD). For example, a content delivery network (CDN) may cache assets (e.g., images, videos, web pages, scripts, etc.) in a cache backed by disk. Although SSDs are fast and reliable, the cache hit tail latency is dependent on the throughput of SSDs. Write operations on SSDs also slow down read operations because SSD write operations require program/erase (P/E) operations issued to the storage chips that block reads to the same chips. Thus, essentially the more write operations the slower the read operations can be performed, leading to increased cache hit tail latency. Further, write operations have more negative impact on the lifespan of SSDs versus read operations.

In some implementations, a cache in memory is extended to a durable storage. Popular assets are kept in cache for faster reads while unpopular assets are cached in the durable storage.

SUMMARY

A computing device includes a volatile memory that includes a first cache, a non-volatile storage that includes a second cache, and a cache service. The cache service, responsive to a cache miss, retrieves that asset from a remote asset source and writes that asset to the first cache and not the second cache. The cache service reads the asset from the first cache responsive to requests for the asset until the asset is evicted from the first cache or until the asset is promoted to the second cache. The cache service promotes the asset to the second cache upon determining that a set of one or more criteria are satisfied including a predefined number of cache hits for the asset when it is in the first cache. The cache service reads the asset from the second cache responsive to requests for the asset until the asset is evicted from the second cache.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
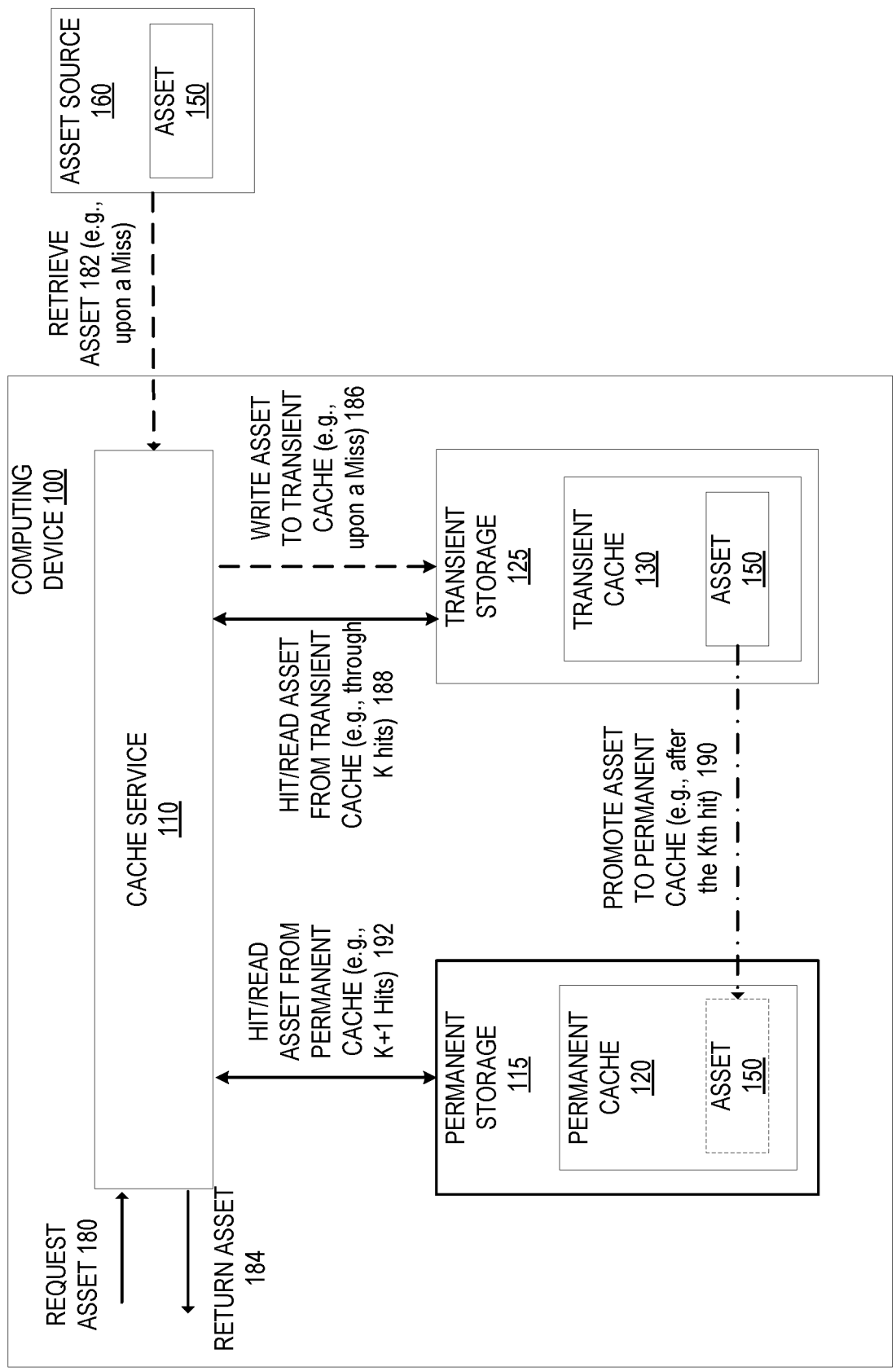
FIG. 1 illustrates an example for an improved caching system that uses multiple caches according to an embodiment.

A method and apparatus for an improved caching system that uses multiple caches is described. In an embodiment, a computing device includes a first cache (referred herein as a transient cache) and a second cache (referred herein as a permanent cache). The transient cache may be part of a storage that is optimized for writes compared to the permanent storage that holds the permanent cache. For instance, the transient storage may be memory (e.g., volatile memory such as DRAM, SRAM, etc.), whereas the permanent storage may be a non-volatile storage (e.g., solid-state drive (SSD), hard disk drive (HDD), etc.). Upon a cache miss for an asset in both the permanent cache and the transient cache, the asset is retrieved from its source and written to the transient cache and not the permanent cache. The asset is read from the transient cache until it is evicted due to a cache eviction policy (e.g., a least recently used policy) or the asset has been promoted to the permanent cache. The asset will be written to the permanent cache only if certain one or more criteria is satisfied (e.g., the number of cache hits meets a predefined number). After writing the asset to the permanent cache, the asset is read from the permanent cache. The asset may then be deleted from the transient cache or marked for eviction from the transient cache.

In an embodiment, the one or more criteria is based on the number of cache hits for the asset in the transient cache. In such an embodiment, the asset will be written to the permanent cache only if it has been read from the transient cache a certain number of times. The asset will be evicted from the transient cache if it has not been read from the transient cache the certain number of times before the cache eviction policy selects the asset for eviction. In another embodiment, the criteria includes the number of cache hits, the time to live (TTL) of the asset, the size of the asset, the content type of the asset, and/or the type of account to which the asset belongs. The size of the asset may have a correlation with an expected future request volume to the asset (e.g., assets that are relatively large may not be requested as often with assets that are relatively small). The content type of the asset may also have a correlation with an expected future request volume to the asset (e.g., some content types may be requested often while others are requested rarely). However, the asset may not be written to the permanent cache even if the number of cache hits meets the certain number (and optionally other criteria are met such as the size of the asset and content type of the asset) if the TTL is below a threshold (e.g., a few seconds). In an embodiment, the type of account to which the asset belongs may affect the criteria. For example, a customer may have a plan that allows the assets to be cached in the permanent cache without being first cached to the transient cache or with criteria that are less strict than other plans. For instance, a plan may require that the number of cache reads is one before writing the asset to the permanent cache while another plan may require the number of cache reads to be greater than one before writing the asset to the permanent cache.

In an embodiment, an asset that has been promoted to the permanent cache may be demoted to the transient cache (e.g., written back to the transient cache). For example, if the asset is to be evicted from the permanent cache according to a cache eviction policy (e.g., an LRU policy), instead of discarding the asset, it can be written back to the transient cache. The asset may then be read from the transient cache instead of the permanent cache and is subject to being promoted back to the permanent cache if the promotion criteria is satisfied.

In an embodiment, the transient storage containing the transient cache is memory (e.g., volatile memory such as DRAM, SRAM, etc.) and the permanent storage containing the permanent cache is an SSD. Thus, in this embodiment, the assets for cache misses are written to memory and not written to disk. The assets will only be written to disk if a predefined set of one or more criteria is met (such as described above). In a specific example where the one or more criteria includes the number of transient cache hits, accessing the asset the certain number of times indicates that the asset is popular enough to be moved to disk (e.g., the asset is not a "one-hit-wonder."). An asset that is read the certain number of times is sometimes referred herein as a popular asset. An asset that has not been read the certain number of times before being evicted is sometimes referred herein as an unpopular asset. As a result, the transient cache effectively caches unpopular assets (at least temporarily), and the permanent cache caches popular assets. Thus, unlike a conventional solution where popular assets are cached in memory and unpopular assets are cached in durable storage, in some embodiments unpopular assets are cached in memory (at least temporarily) and popular assets are cached in the durable storage (such as a SSD).

Thus, in an embodiment, every asset in the transient cache is either promoted to the permanent cache after it is hit the certain number of times (which indicates it is popular enough to be stored longer) or it is evicted from transient cache naturally due to the limited size of the transient cache and the asset's lack of hits (which indicates the asset's lack of popularity). This addresses the problem of a "one-hit-wonder" by writing an asset to the permanent cache only after determining the asset is popular. Also, unlike conventional solutions that require assets be missed at least twice before being written to cache, the asset is only missed once before it is cached thereby reducing bandwidth use and other network and computing resources.

Because unpopular assets are not written to disk, the number of writes to the SSD is reduced. Reducing writes to the SSD will reduce the wear on the SSD thereby improving the lifespan of the SSD. Further, reducing writes to the SSD by writing only popular assets to the SSD reduces read latency. Thus, disk writes are reduced and read latency is reduced. Because only popular assets are written to the permanent cache, the effective size of the permanent cache is increased due to reduced pressure from removal of writes of unpopular assets. This in turn increases the hit ratio. Further, in an embodiment where an asset is not written to the permanent cache if the TTL of that asset is below a threshold, that asset is served only from the transient cache which may prevent disk churn of the SSD due to writes of assets that have a relatively short lifetime.

The caching technique described herein may be used concurrently with other caching provided by the operating system of the computing device, such as a disk cache.

FIG. 1 illustrates an example for an improved caching system that uses multiple caches according to an embodiment. The computing device 100 includes a cache service 110, a permanent storage 115, and a transient storage 125. The computing device 100 also includes other components that are not illustrated (e.g., processor(s), an operating system, input/output control, etc.) to simplify understanding of the embodiment. The computing device 100 is a computing device that uses caching. The computing device 100 may be a server, a desktop, a laptop, a phone, a tablet, a gaming system, a set top box, a wearable device, an internet of things (IoT) device, a database cache device, etc. In a specific example, the computing device 100 is a node in a content delivery network (CDN).

The cache service 110 is a service that manages the improved caching system described herein. The cache service 110 receives requests for assets, computes cache keys, accesses the permanent cache 120 in the permanent storage 115 (causing the reading and writing to the permanent cache 120), accesses the transient cache 130 in the transient storage 125 (causing the reading and writing to the transient cache 130), and manages retrieving assets from the asset source 160.

The transient storage 125 includes the transient cache 130. The permanent storage 115 includes the permanent cache 120. The transient storage 125 may have a smaller storage capacity than the permanent storage 115. The permanent storage 115 may be persistent storage. The transient storage 125 may be non-persistent (volatile) storage. The transient storage 125 may be faster than the permanent storage 115. The use of the word permanent in the permanent cache 120 is relative to the term transient in the transient cache 130. It is expected that assets are stored in the permanent cache 120 for longer periods than stored in the transient cache 130. Although the term permanent is used, assets written to the permanent cache 120 are subject to being evicted according to a cache eviction policy for the permanent cache 120 (e.g., an LRU cache eviction policy). Thus, assets in the permanent cache 120 typically have a limited lifespan. A cache eviction policy also applies to the transient cache 130 (e.g., an LRU cache eviction policy).

The transient storage 125 may be optimized for writes compared to the permanent storage 115. For instance, write operations to the transient cache 130 in the transient storage 125 may be faster than write operations to the permanent cache 120 in the permanent storage 115. Write operations to the transient cache 130 in the transient storage 125 may have less impact on the lifespan to the transient storage 125 compared to similar write operations to the permanent cache 120 in the permanent storage 115. In an embodiment, the transient storage 125 is memory (e.g., volatile memory such as DRAM, SRAM, etc.) and the permanent storage 115 is an SSD. If the transient storage 125 is system memory, the use of a portion of the memory for the transient cache 130 may affect other resources in the system. The size of the transient cache 130 dictates how long a given asset exists in cache before it is evicted. If the size of the transient cache 130 is too small, new assets will evict old assets before the old assets receive hits that promote them to the permanent cache 120. Cache retention of an asset that is too short may be undesirable because it leads to more misses and therefore more cost in retrieving the asset. However, if the size of the transient cache 130 is too large, the less memory is available for the operating system level cache (e.g., disk cache). Accordingly, in an embodiment, the size of the transient cache 130 is chosen based on asset processing volume (e.g., traffic volume), usage patterns, and the hardware configuration (e.g., total capacity of the transient storage 125).

Upon a cache miss, the cache service 110 causes the asset to be retrieved from the asset source 160 and written to the transient cache 130 and at least not initially to the permanent cache 120. The cache service 110 causes the asset to be written to the permanent cache 120 only if certain one or more criteria are met, such as if the asset is read from the transient cache a certain number of times prior to the asset being evicted from the transient cache 130 (e.g., the asset is a popular asset). If the asset is an unpopular asset, the asset will be evicted from the transient cache 130 without being written to the permanent cache 120. After writing the asset to the permanent cache 120, the cache service 110 will cause the asset to be read from the permanent cache 120 (and not from the transient cache 130).

The cache service 110 receives a request for a cacheable asset at operation 180. The request may be sent from a different process on the computing device 100. For example, in the case the computing device 100 is a CDN node, the request may be sent by a web server for a web asset that has been requested by a client computing device. The cache service 110 processes the request including determining whether the requested asset is cached in either the permanent cache 120 or the transient cache 130. Assuming that the requested asset is not available in these caches (there is a cache miss), the cache service 110 causes the requested asset to be retrieved at operation 182 from the asset source 160. In another example, instead of pulling the asset from the asset source 160 after a cache miss, the asset may be pre-fetched by the cache service 110 (e.g., retrieved prior to receiving a request for that asset) or pushed by the asset source 160 to the computing device 100. By way of example in FIG. 1, the asset source 160 includes the asset 150.

The asset source 160 is a source of data for the asset. The asset source 160 may be the single source of truth for the asset. The asset source 160 may be the origin source for the asset, a cache for the origin source for the asset, or a computing device similar to the computing device 100 that has cached the asset, for example. The asset source 160 may be remote from the computing device 100 or in some cases be part of the same machine as the computing device 100 or part of the same data center as the computing device 100. In a specific example where the computing device 100 is a CDN node, the asset source 160 may be the origin server for the asset 150. In such an example, the cache service 110 may make a request (e.g., an HTTP(S) request) to the asset source 160 to retrieve the asset, or the asset source 160 may push the asset to the computing device 100 via the cache service 110. As another example, the asset source 160 may be a database and the computing device 100 is a database cache device. In such an example, the cache service 110 may make a database query to the asset source 160 to retrieve the asset.

The cache service 110 causes the asset to be written to the transient cache 130 at operation 186 (e.g., upon a miss and retrieval of the asset from the asset source 160). As shown in FIG. 1, the asset 150 is written to the transient cache 130. The cache service 110 may also set a cache hit counter for the asset that represents the number of hits for the asset from the transient cache 130 and/or the permanent cache 120. The cache service 110 responds to the request by returning the asset at operation 184.

If the cache service 110 receives another request for the same asset prior to that asset being evicted from the transient cache 130 (and prior to the asset being promoted to the permanent cache 120), the cache service 110 reads the asset from the transient cache at operation 188. For instance, the cache service 110 may compute a cache key for the requested asset and checks the permanent cache 120 and/or the transient cache 130 for the asset. In an embodiment, the cache service 110 checks the permanent cache 120 for the asset first and upon a miss then checks the transient cache 130. In another embodiment, the cache service 110 checks the transient cache 130 first and upon a miss, then checks the permanent cache 120. The cache service 110 may increment the cache hit counter for each successful read operation of the asset in the transient cache 130 until the asset is evicted from the transient cache 130. The cache service 110 reads the asset from the transient cache 130 (if not evicted) until the asset is promoted to the permanent cache 120. The cache service 110 may then read the asset from the permanent cache 120.

The cache service 110 promotes the asset from the transient cache 130 to the permanent cache 120 at operation 190 if a predefined set of one or more criteria is met. In an embodiment, the one or more criteria is based on the number of cache hits K for the asset in the transient cache, where K is one or more. In a specific example, K is one; meaning that the first cache hit for the asset in the transient cache 130 will cause the asset to be written to the permanent cache 120; and the next request for the asset may be read from the permanent cache 120. In another embodiment, the criteria include the number of cache hits, the time to live (TTL) of the asset, the size of the asset, the content type of the asset, and/or the type of account to which the asset belongs. The number of cache hits, the size of the asset, and the content of the asset may each, or in combination, have a correlation to an expected future request volume for the asset. However, the asset may not be written to the permanent cache 120 even if the number of cache hits meets the certain number (and optionally other criteria are met such as the size of the asset and content type of the asset) if the TTL is below a threshold (e.g., a few seconds). In an embodiment, the type of account to which the asset belongs may affect the criteria. For example, a customer may have a plan that allows the assets to be cached in the permanent cache without being first cached to the transient cache or with criteria that are less strict than other plans. For instance, a plan may require that the number of cache reads is one before writing the asset to the permanent cache while another plan may require the number of cache reads to be greater than one before writing the asset to the permanent cache. As shown in FIG. 1, the asset 150 is written to the permanent cache 120. If the cache service 110 receives another request for the same asset prior to that asset being evicted from the permanent cache 120, the cache service 110 reads the asset from the permanent cache 120 at operation 192. Thus, popular assets are cached and read from the permanent cache 120.

In an embodiment, to promote the asset to the permanent cache 120, the asset is copied from the transient cache 130 to the permanent cache 120. The copy operation may be in its own thread. The asset may not be deleted from the transient cache 130 immediately, which allows the asset to be read from the transient cache 130 for concurrent requests. However, the asset may be moved to the end of an LRU queue and marked inactive and subject to removal. In an embodiment, the write to the permanent cache 120 is written through the disk cache of the operating system of the computing device 100. For instance, in the case of a Linux operating system, the write is through page cache and the kernel flushes the write to the permanent cache 120.

Although not illustrated in FIG. 1, in an embodiment, an asset that has been promoted to the permanent cache 120 may be demoted to the transient cache 130 (e.g., written back to the transient cache 130). The demotion of an asset can be done actively or passively (e.g., during eviction) based on a set of one or more criteria. By way of example, if the asset 150 is to be evicted from the permanent cache 120 (e.g., according to cache eviction policy such as an LRU policy), instead of discarding the asset 150, the cache service 110 can cause the asset 150 to be written back to the transient cache 130 (e.g., if the TTL of the asset 150 is above a threshold). The asset 150 may then be read from the transient cache 130 instead of the permanent cache 120 and is subject to being promoted back to the permanent cache 120 if the promotion criteria is satisfied.

Although FIG. 1 shows an embodiment where the permanent storage 115 and the permanent cache 120 are within the same computing device as the transient storage 125 and the transient cache 130, in another embodiment the permanent storage 115 and the transient storage 125 are located in different computing devices. For example, the permanent storage 115 and the transient storage 125 may be located in different computing devices of the same data center.

FIGS. 2A-2D show example operations for an improved caching system that uses multiple caches according to an embodiment. The operations of FIGS. 2A-2D are described with respect to the exemplary embodiment of the computing device 100 of FIG. 1. At operation 1, the cache service 110 receives a request for the asset 150. The cache service 110 may compute a cache key for the asset and checks the permanent cache 120 and the transient cache 130 for the asset 150. As represented in operations 2A and 2B, a cache miss occurs for the permanent cache 120 and the transient cache 130 for the asset 150. The cache service 110 may check the permanent cache 120 first before checking the transient cache 130, or vice versa. Upon the miss, the cache service 110 retrieves the asset from the asset source 160. In an example where the computing device 100 is a CDN node, the cache service 110 may cause an HTTP(S) request to be sent to the asset source 160 to retrieve the asset 150. After retrieving the asset 150 from the asset source 160, the cache service 110 causes the asset 150 to be written to the transient cache 130 in the transient storage 125 at operation 4. At this time, the asset 150 is cached in the transient cache 130 and not the permanent cache 120. Also, at the time of writing the asset 150 to the transient cache 130, it is unknown whether the asset 150 is a popular asset or is an unpopular asset. The cache service 110 returns the asset 150 to the requester at operation 5. The order of the operations 4 and 5 may be swapped in an embodiment. For instance, the asset may be returned to the requester prior to writing the asset 150 to the transient cache 130. The asset 150 will remain in the transient cache 130 until it is evicted according to a cache eviction policy (e.g., LRU, first-in-first-out (FIFO), etc.). The asset 150 will not be written to the permanent cache 120 until and unless a set of one or more criteria is satisfied for the asset 150.

Figure 2A:
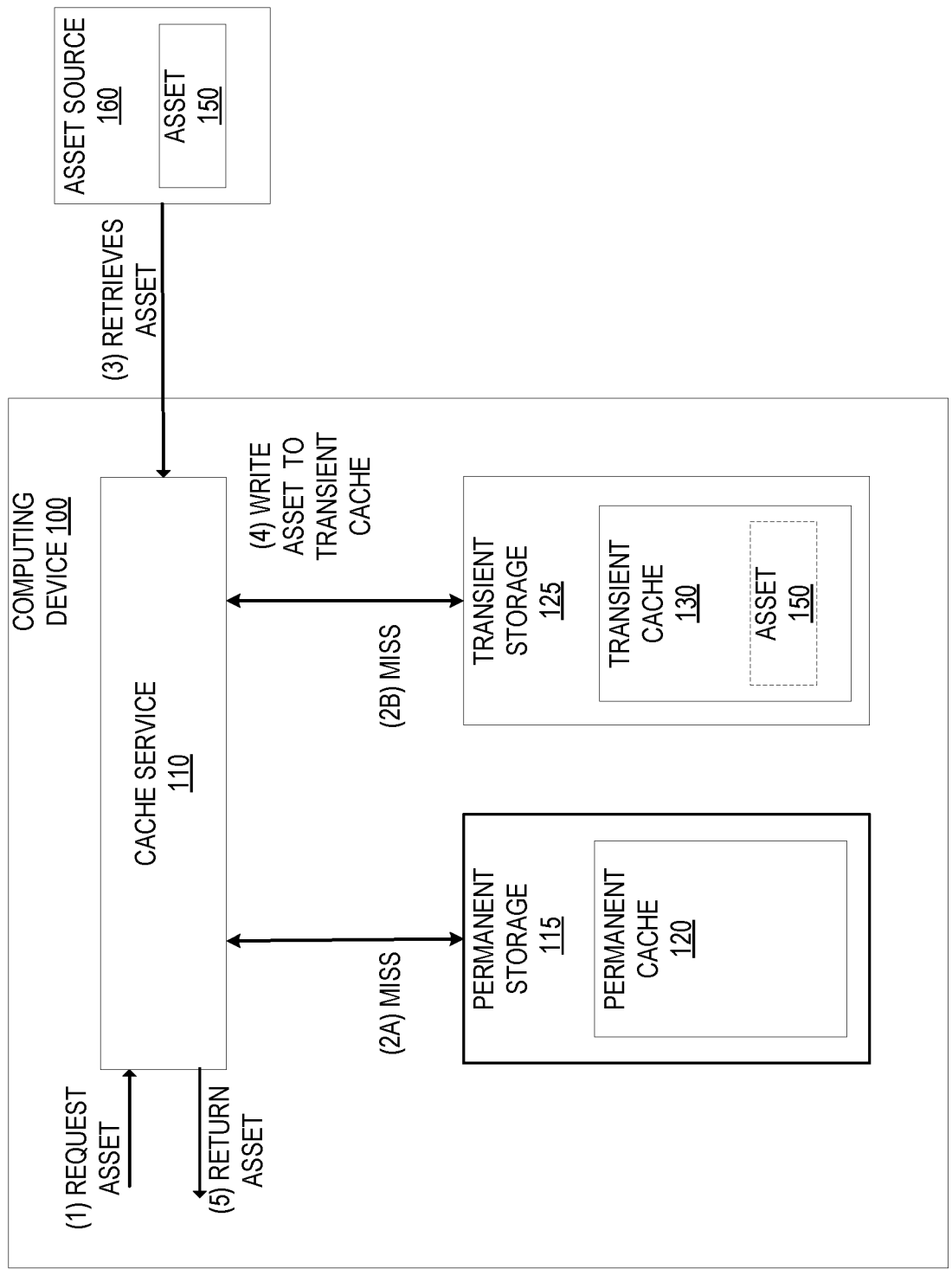
FIG. 2A shows a first part of example operations for an improved caching system that uses multiple caches according to an embodiment.
Figure 2B:
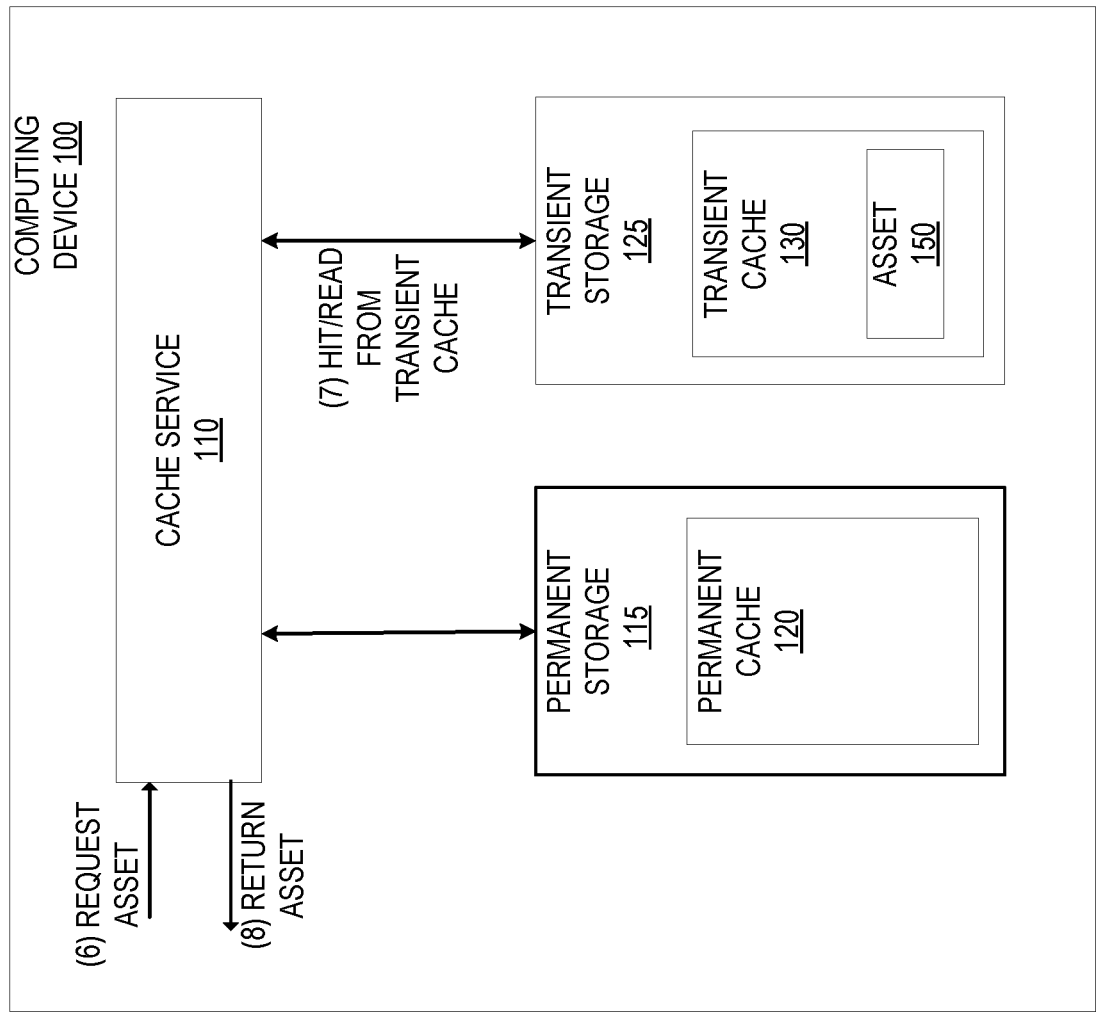
FIG. 2B shows a second part of example operations for an improved caching system that uses multiple caches according to an embodiment.

Referring to FIG. 2B, the cache service 110 receives another request for asset 150 at operation 6. The cache service 110 may compute a cache key for the asset 150 and checks at least the transient cache 130 for the asset 150, which exists in the transient cache 130. In an embodiment, the cache service 110 also checks the permanent cache 120 for the asset 150, which will be a miss. The cache service 110 may check the permanent cache 120 for the asset 150 before checking the transient cache 130 for the asset 150. Since the asset 150 is in the transient cache 130, the cache service 110 reads the asset 150 from the transient cache 130 at operation 7. The cache service 110 may increment a cache hit counter for the asset 150 that represents the number of hits for the asset from the transient cache 130 and/or permanent cache 120. The cache service 110 returns the asset 150 to the requester at operation 8.

Figure 2C:
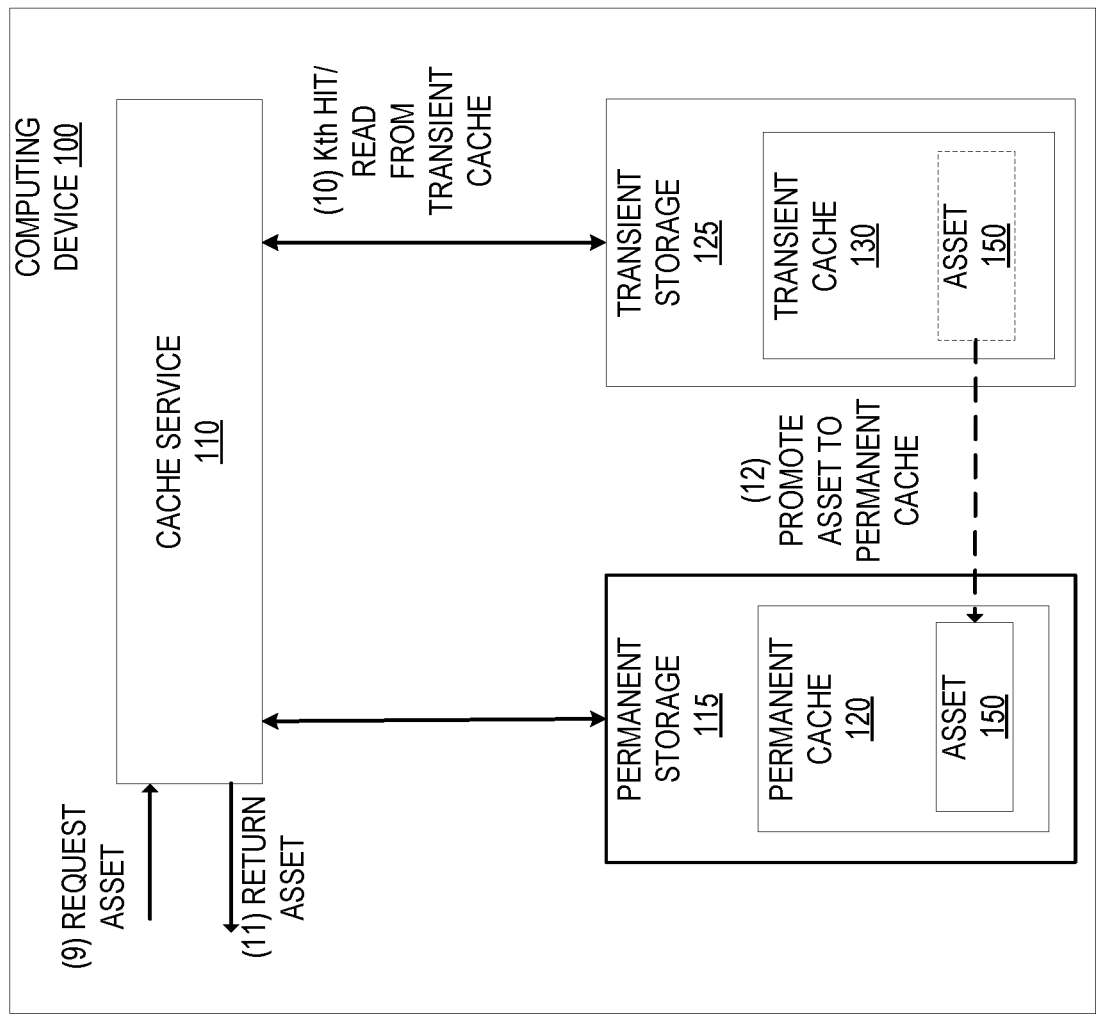
FIG. 2C shows a third part of example operations for an improved caching system that uses multiple caches according to an embodiment.

The cache service 110 will read the asset 150 from the transient cache 130 for future requests until the asset is evicted according to a cache eviction policy or until the asset is promoted to the permanent cache 120. Thus, in an embodiment, every asset in the transient cache 130 (including the asset 150) is either promoted to the permanent cache 120 after meeting certain criteria (e.g., after hitting a certain number of times which indicates that the asset is popular enough to be stored longer) or it is evicted from the transient cache 130 naturally due to its lack of hits. The cache promotion occurs when a set of one or more criteria is satisfied for the asset 150. Referring to FIG. 2C, the set of one or more criteria is based on the number of hits for the asset 150, which serves as an indication of the popularity of the asset. The number of hits may be predefined in an embodiment and may be configurable. In the example of FIG. 2C, the number is represented by K, where K is one or more. In a specific example, K is one. Meaning that the first cache hit for the asset 150 in the transient cache 130 will trigger the promotion of the asset 150 to the permanent cache 120.

Referring to FIG. 2C, at operation 9, the cache service 110 receives a request for the asset 150. Like before, the cache service 110 may compute a cache key for the asset 150 and checks at least the transient cache 130 for the asset 150, which exists in the transient cache 130. As before, the cache service 110 may also check the permanent cache 120 for the asset 150, which will be a miss, before checking the transient cache 130 for the asset 150. Since the asset 150 is in the transient cache 130, the cache service 110 reads the asset 150 from the transient cache 130 at operation 10. The cache service 110 may increment a cache hit counter for the asset 150 that represents the number of hits for the asset from the transient cache 130, which in this example will be Kth hit. The cache service 110 returns the asset to the requester at operation 11.

In the example of FIG. 2C, the cache promotion policy is based at least on the number of hits K for the resource. Since the asset 150 has been hit K times in the transient cache 130 (prior to it being evicted from the transient cache 130 which would reset the value of K), the cache service 110 promotes the asset 150 from the transient cache 130 to the permanent cache 120 at operation 12. The cache promotion policy may also consider one or more other criteria such as the TTL of the asset 150, the size of the asset 150, the content type of the asset 150, and/or the type of account to which the asset 150 belongs. For instance, the asset 150 may not be promoted even if the number of cache hits meets K if the TTL of asset 150 is below a threshold (e.g., a few seconds). In an embodiment, to promote the asset to the permanent cache 120, the asset 150 is copied from the transient cache 130 to the permanent cache 120. The copy operation may be in its own thread. The asset 150 may not be deleted from the transient cache 130 immediately, which allows the asset 150 to be read from the transient cache 130 for concurrent requests. However, the asset 150 may be moved to the end of an LRU queue and marked inactive and subject to removal. In an embodiment, the write to the permanent cache 120 is written through the disk cache of the operating system of the computing device 100. For instance, in the case of a Linux operating system, the write is through page cache and the kernel flushes the write to the permanent cache 120. The order of the operations 11 and 12 may be swapped in an embodiment. For instance, the asset may be promoted to the permanent cache 120 prior to returning the asset to the requester.

As shown in FIG. 2C, the asset 150 is written to the permanent cache 120. If the cache service 110 receives another request for the same asset prior to that asset being evicted from the permanent cache 120, the cache service 110 reads the asset from the permanent cache 120. Thus, popular assets are cached and read from the permanent cache 120. For example, referring to FIG. 2D, the cache service 110 receives a request for the asset 150 at operation 13. Like before, the cache service 110 may compute a cache key for the asset 150. The cache service 110 at least checks the permanent cache 120 for the asset 150, which exists in the permanent cache 120. If there is a hit in the permanent cache 120 for the asset, the cache service 110 does not check the transient cache 130 for the asset in an embodiment. Since the asset 150 is in the permanent cache 120, the cache service 110 reads the asset 150 from the permanent cache 120 at operation 14. The cache service 110 returns the asset to the requester at operation 15.

In an embodiment, an asset that has been promoted to the permanent cache 120 may be subject to being demoted back to the transient cache 130 if certain one or more criteria are met. For instance, at some point, the asset 150 may be demoted from the permanent cache 120 back to the transient cache 130. The demotion of the asset 150 may be done actively or passively (e.g., during eviction) based on a set of one or more criteria. The set of one or more demotion criteria may be based on the number of cache hits for the asset 150 in the permanent cache 120, the size of the asset 150, the TTL of the asset 150, and/or the content type of the asset 150. For instance, the demotion of the assets may be based on a least frequently used (LFU) policy where the assets that are used least often are demoted first to the transient cache 130. In another embodiment, an LRU policy is used where the assets that are least recently used are demoted first to the transient cache 130. The demotion of an asset may occur only if the TTL of the asset is above a threshold. To say it another way, an asset may be discarded instead of demoted if the TTL of the asset is below a threshold. The content type of the asset 150 may be considered in a demotion policy. For instance, certain file types that are indicative of static content (e.g., image files are often static whereas HTML files are often dynamic) may be demoted while file types that are indicative of dynamic content may not be demoted. The size of the asset 150 may be considered in a demotion policy and optionally weighted according to the size. For instance, if the size of the asset 150 is relatively large, the asset 150 may need to have a number of hits relative to its size to justify writing the asset back to the transient cache 130. For example, if the asset 150 is 100 times larger than the average asset, the asset 150 may need to have 100 times the number of hits to evict 100 smaller files.

Figure 2D:
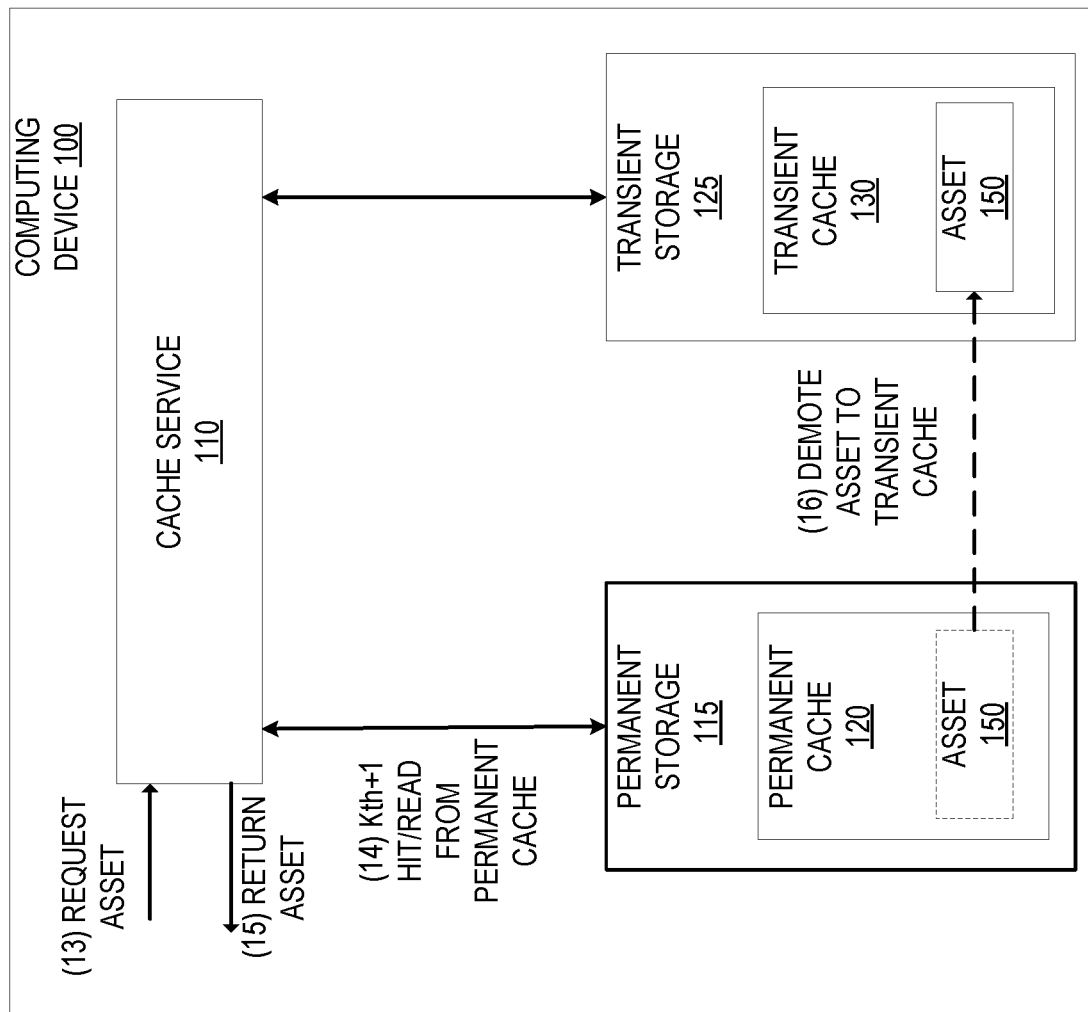
FIG. 2D shows a fourth part of example operations for an improved caching system that uses multiple caches according to an embodiment.

Thus, by way of example, if the asset 150 is to be evicted from the permanent cache 120 (e.g., according to cache eviction policy such as an LRU policy), instead of discarding the asset 150, the cache service 110 can cause the asset 150 to be written back to the transient cache 130 (e.g., if the TTL of the asset 150 is above a threshold and/or the other cache demotion criteria are satisfied). As shown in FIG. 2D, at operation 16, the asset 150 is demoted from the permanent cache 120 back to the transient cache 130. The asset may then be read from the transient cache 130 instead of the permanent cache 120 and is subject to being promoted back to the permanent cache 120 if the promotion criteria is satisfied.

Although FIGS. 2A-2D show an embodiment where the permanent storage 115 and the permanent cache 120 are within the same computing device as the transient storage 125 and the transient cache 130, in another embodiment the permanent storage 115 and the transient storage 125 are located in different computing devices. For example, the permanent storage 115 and the transient storage 125 may be located in different computing devices of the same data center.

Figure 3A:
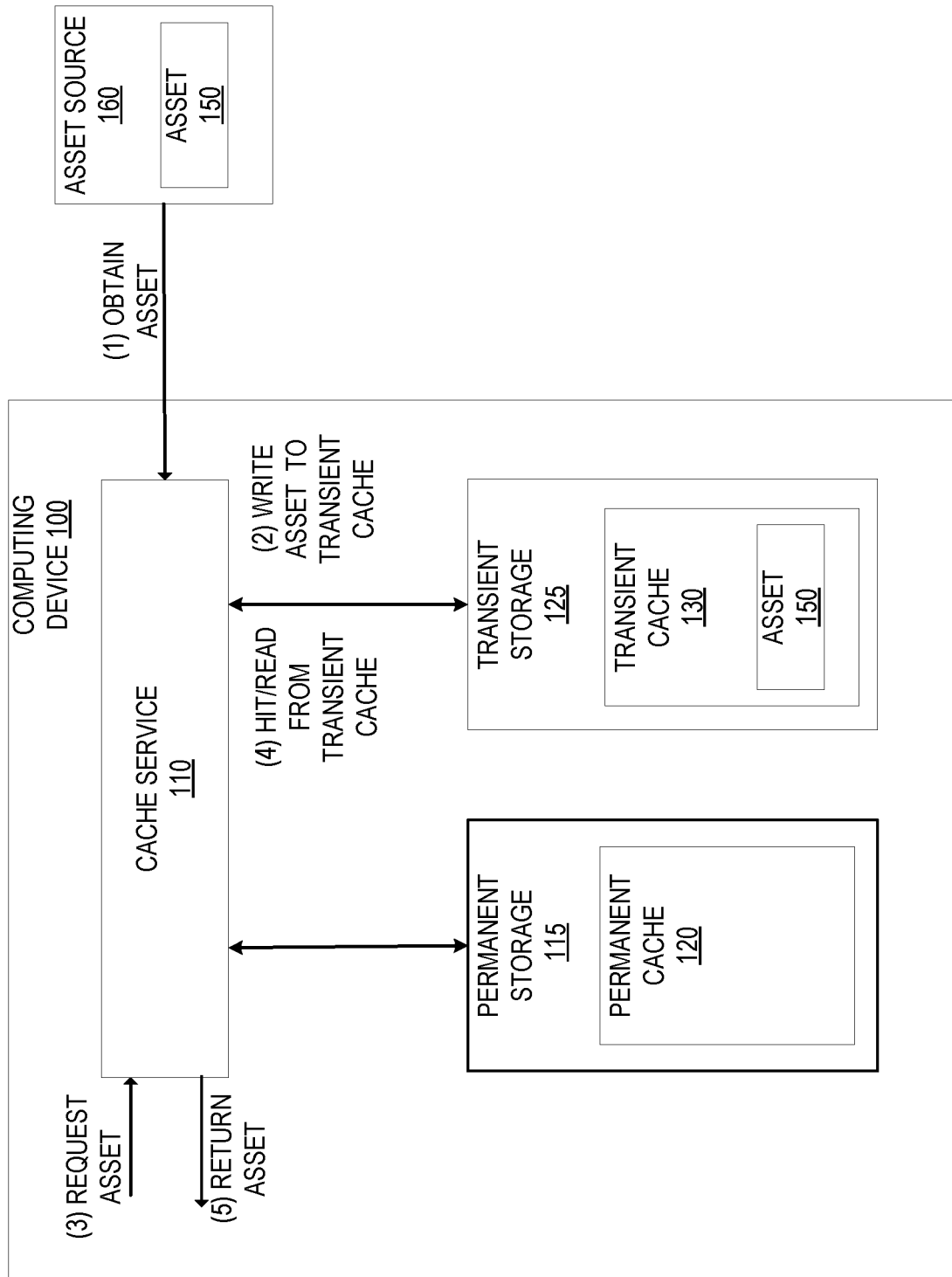
FIG. 3A shows a first part of example operations for an improved caching system that uses multiple caches according to an embodiment.
Figure 3B:
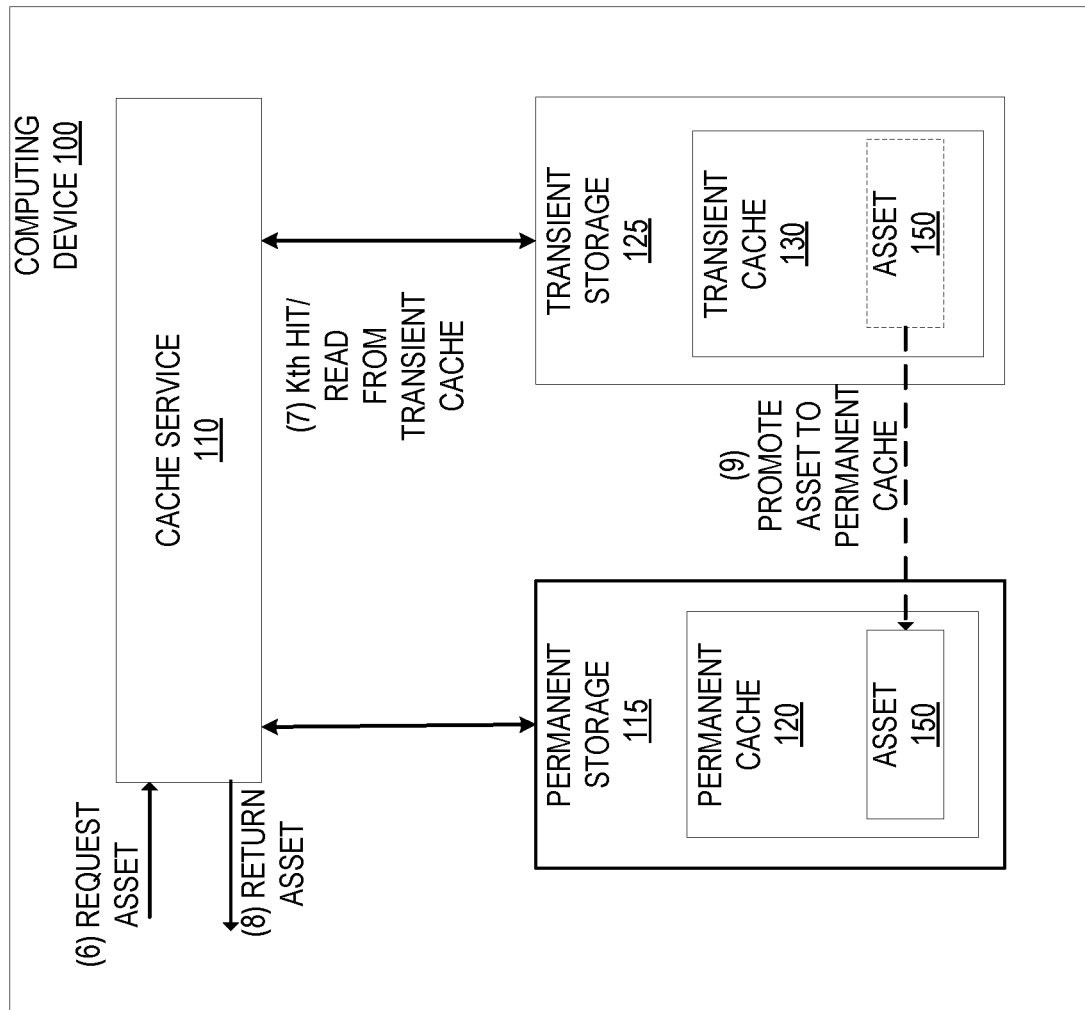
FIG. 3B shows a second part of example operations for an improved caching system that uses multiple caches according to an embodiment.
Figure 3C:
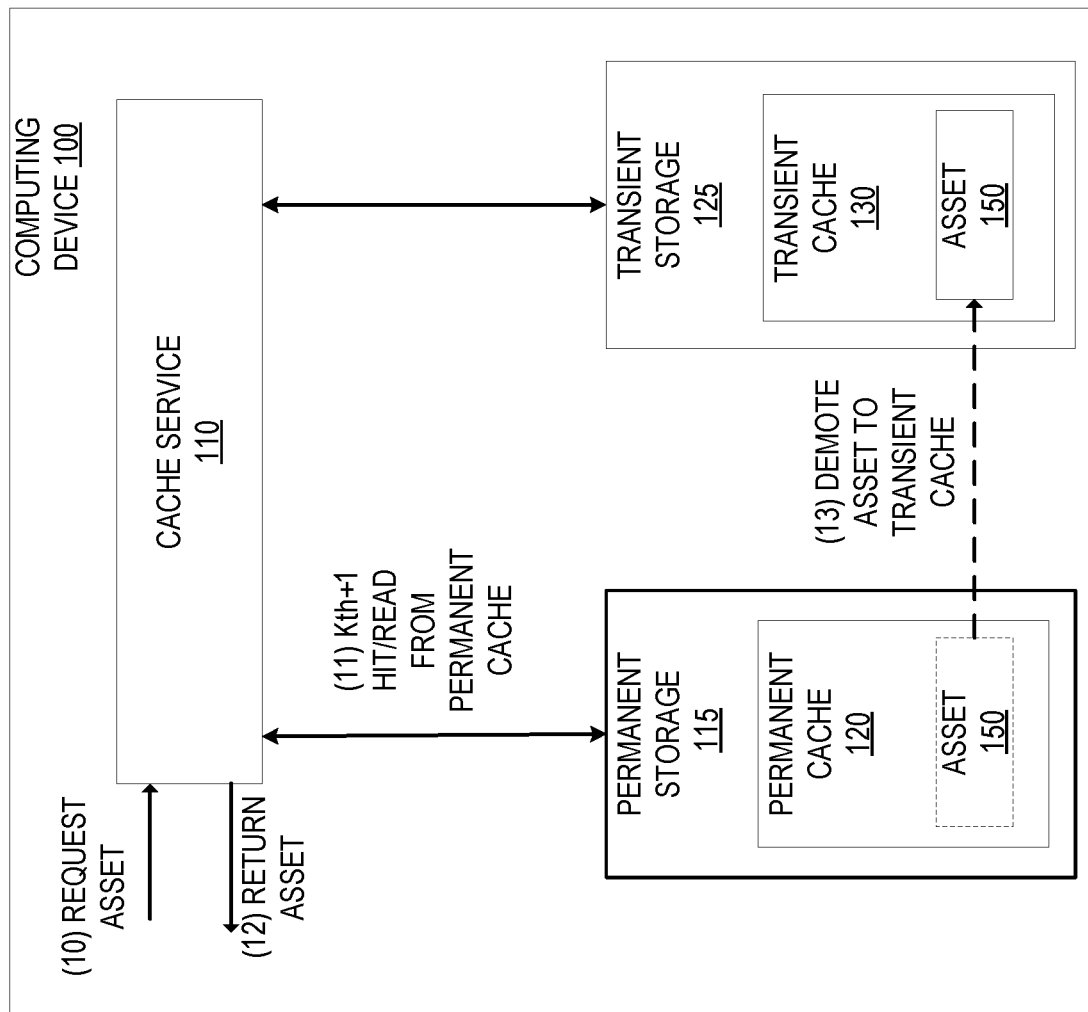
FIG. 3C shows a third part of example operations for an improved caching system that uses multiple caches according to an embodiment.

FIGS. 3A-3C show example operations for an improved caching system that uses multiple caches according to an embodiment. The operations of FIGS. 3A-3C are described with respect to the exemplary embodiment of the computing device 100 of FIG. 1. The operations of FIGS. 3A-3C are similar to the operations of FIGS. 2A-2D but in FIG. 3A the asset is retrieved prior to the computing device 100 receiving a request for the asset. Thus, at operation 1, the cache service 110 obtains the asset 150 from the asset source 160. The asset 150 may be received by the cache service 110 as a result of the asset source 160 pushing the asset or by the cache service 110 prefetching the asset. In an example where the computing device 100 is a CDN node, the cache service 110 may prefetch the asset 150 from the asset source 160 by causing an HTTP(S) request to be sent to the asset source 160 to retrieve the asset 150, or may be pushed the asset 150 from the asset source 160. After obtaining the asset 150 from the asset source 160, the cache service 110 causes the asset 150 to be written to the transient cache 130 in the transient storage 125 at operation 2. At this time, the asset 150 is cached in the transient cache 130 and not the permanent cache 120. Also, at the time of writing the asset 150 to the transient cache 130, it is unknown whether the asset 150 is a popular asset or is an unpopular asset. Sometime later, at operation 3, the cache service 110 receives a request for the asset 150. The cache service 110 may compute a cache key for the asset and checks at least the transient cache 130 for the asset 150, which exists in the transient cache 130. In an embodiment, the cache service 110 also checks the permanent cache 120 for the asset 150, which will be a miss. The cache service 110 may check the permanent cache 120 for the asset before checking the transient cache 130 for the asset 150. Since the asset 150 is in the transient cache 130, the cache service 110 reads the asset 150 from the transient cache 130 at operation 4. The cache service 110 may increment a cache hit counter for the asset 150 that represents the number of hits for the asset from the transient cache 130 and/or permanent cache 120. The cache service 110 returns the asset to the requester at operation 5.

The cache service 110 will read the asset 150 from the transient cache 130 for future requests until the asset is evicted according to a cache eviction policy or until the asset is promoted to the permanent cache 120. Thus, in an embodiment, every asset in the transient cache 130 (including the asset 150) is either promoted to the permanent cache 120 after meeting certain criteria (e.g., after hitting a certain number of times which indicates that the asset is popular enough to be stored longer) or it is evicted from the transient cache 130 naturally due to its lack of hits. The cache promotion occurs when a set of one or more criteria is satisfied for the asset 150. Referring to FIG. 3B, the set of one or more criteria is based on the number of hits for the asset 150, which serves as an indication of the popularity of the asset. The number of hits may be predefined in an embodiment and may be configurable.

Referring to FIG. 3B, at operation 6, the cache service 110 receives a request for the asset 150. Like before, the cache service 110 may compute a cache key for the asset and checks at least the transient cache 130 for the asset 150, which exists in the transient cache 130. As before, the cache service 110 may also check the permanent cache 120 for the asset 150, which will be a miss, before checking the transient cache 130 for the asset 150. Since the asset 150 is in the transient cache 130, the cache service 110 reads the asset 150 from the transient cache 130 at operation 7. The cache service 110 may increment a cache hit counter for the asset 150 that represents the number of hits for the asset from the transient cache 130, which in this example will be Kth hit. The cache service 110 returns the asset 150 to the requester at operation 8.

In the example of FIG. 3B, the cache promotion policy is based at least on the number of hits K for the resource. Since the asset 150 has been hit K times in the transient cache 130 (prior to it being evicted from the transient cache 130 which would reset the value of K), the cache service 110 promotes the asset 150 from the transient cache 130 to the permanent cache 120 at operation 9. The cache promotion policy may also consider one or more other criteria such as the TTL of the asset 150, the size of the asset 150, the content type of the asset 150, and/or the type of account to which the asset 150 belongs. For instance, the asset 150 may not be promoted even if the number of cache hits meets K if the TTL of asset 150 is below a threshold (e.g., a few seconds). In an embodiment, to promote the asset to the permanent cache 120, the asset 150 is copied from the transient cache 130 to the permanent cache 120. The copy operation may be in its own thread. The asset 150 may not be deleted from the transient cache 130 immediately, which allows the asset 150 to be read from the transient cache 130 for concurrent requests. However, the asset 150 may be moved to the end of an LRU queue and marked inactive and subject to removal. In an embodiment, the write to the permanent cache 120 is written through the disk cache of the operating system of the computing device 100. For instance, in the case of a Linux operating system, the write is through page cache and the kernel flushes the write to the permanent cache 120. The order of the operations 8 and 9 may be swapped in an embodiment. For instance, the asset may be promoted to the permanent cache 120 prior to returning the asset to the requester.

As shown in FIG. 3B, the asset 150 is written to the permanent cache 120. If the cache service 110 receives another request for the same asset prior to that asset being evicted from the permanent cache 120, the cache service 110 reads the asset from the permanent cache 120. Thus, popular assets are cached and read from the permanent cache 120. For example, referring to FIG. 3C, the cache service 110 receives a request for the asset at operation 10. Like before, the cache service 110 may compute a cache key for the asset 150. The cache service 110 at least checks the permanent cache 120 for the asset 150, which exists in the permanent cache 120. If there is a hit in the permanent cache 120 for the asset, the cache service 110 does not check the transient cache 130 for the asset in an embodiment. Since the asset 150 is in the permanent cache 120, the cache service 110 reads the asset 150 from the permanent cache 120 at operation 11. The cache service 110 returns the asset to the requester at operation 12.

In an embodiment, an asset that has been promoted to the permanent cache 120 may be subject to being demoted back to the transient cache 130 if certain one or more criteria are met. For instance, at some point, the asset 150 may be demoted from the permanent cache 120 back to the transient cache 130. The demotion of the asset 150 may be done actively or passively (e.g., during eviction) based on a set of one or more criteria. The set of one or more demotion criteria may be based on the number of cache hits for the asset 150 in the permanent cache 120, the size of the asset 150, the TTL of the asset 150, and/or the content type of the asset 150. For instance, the demotion of the assets may be based on a least frequently used (LFU) policy where the assets that are used least often are demoted first to the transient cache 130. In another embodiment, an LRU policy is used where the assets that are least recently used are demoted first to the transient cache 130. The demotion of an asset may occur only if the TTL of the asset is above a threshold. To say it another way, an asset may be discarded instead of demoted if the TTL of the asset is below a threshold. The content type of the asset 150 may be considered in a demotion policy. For instance, certain file types that are indicative of static content (e.g., image files are often static whereas HTML files are often dynamic) may be demoted while file types that are indicative of dynamic content may not be demoted. The size of the asset 150 may be considered in a demotion policy and optionally weighted according to the size. For instance, if the size of the asset 150 is relatively large, the asset 150 may need to have a number of hits relative to its size to justify writing the asset back to the transient cache 130. For example, if the asset 150 is 100 times larger than the average asset, the asset 150 may need to have 100 times the number of hits to evict 100 smaller files.

Thus, by way of example, if the asset 150 is to be evicted from the permanent cache 120 (e.g., according to cache eviction policy such as an LRU policy), instead of discarding the asset 150, the cache service 110 can cause the asset 150 to be written back to the transient cache 130 (e.g., if the TTL of the asset 150 is above a threshold and/or the other cache demotion criteria are satisfied). As shown in FIG. 3C, at operation 13, the asset 150 is demoted from the permanent cache 120 back to the transient cache 130. The asset may then be read from the transient cache 130 instead of the permanent cache 120 and is subject to being promoted back to the permanent cache 120 if the promotion criteria is satisfied.

Although FIGS. 3A-3C show an embodiment where the permanent storage 115 and the permanent cache 120 are within the same computing device as the transient storage 125 and the transient cache 130, in another embodiment the permanent storage 115 and the transient storage 125 are located in different computing devices. For example, the permanent storage 115 and the transient storage 125 may be located in different computing devices of the same data center.

Figure 4:
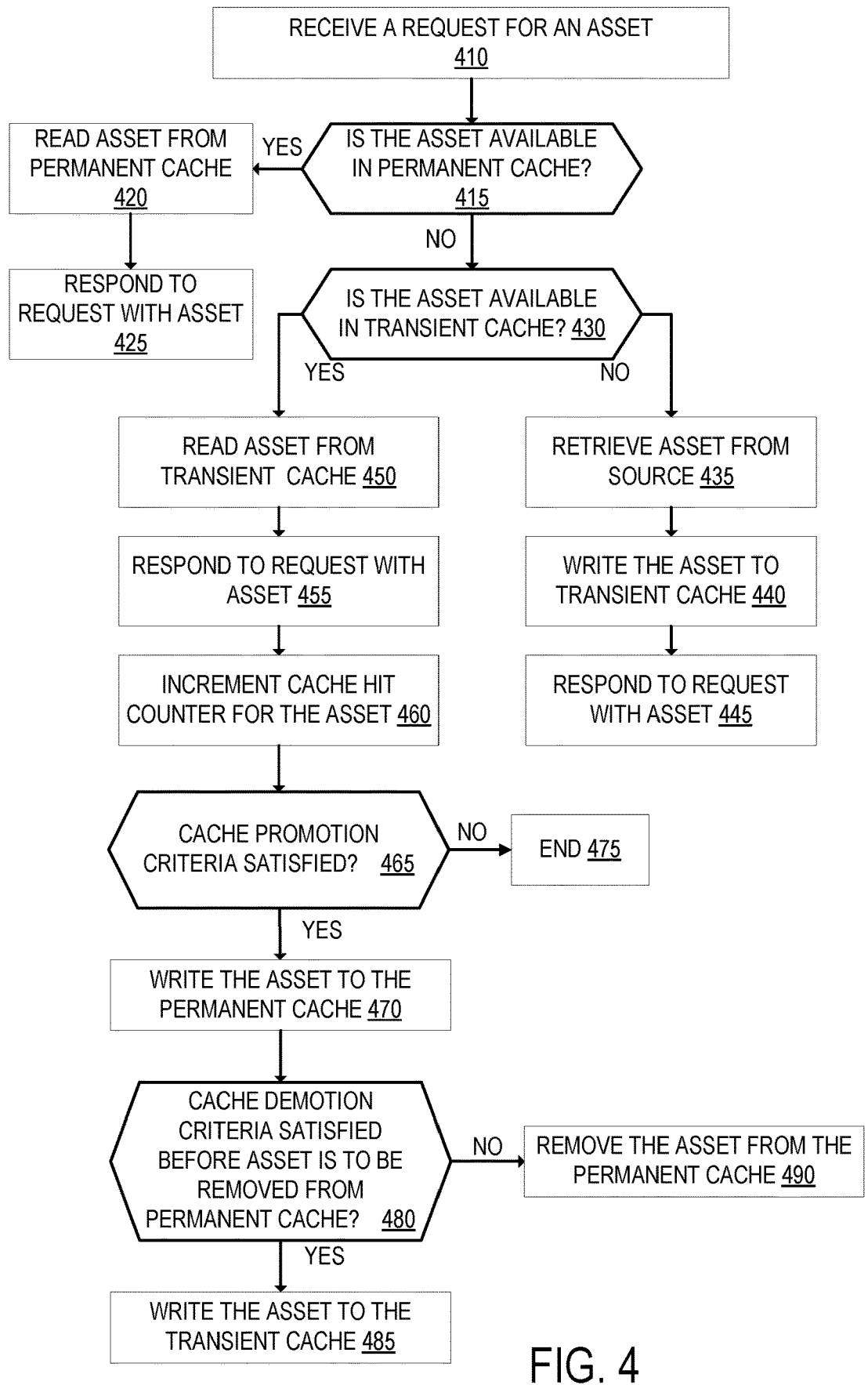
FIG. 4 is a flow diagram that illustrates exemplary operations for an improved caching system that uses multiple caches according to an embodiment.

FIG. 4 is a flow diagram that illustrates exemplary operations for an improved caching system that uses multiple caches according to an embodiment. The operations of FIG. 4 are described with reference to the exemplary embodiment of FIG. 1. However, the exemplary embodiment of FIG. 1 can perform different operations than those described with reference to FIG. 4, and the operations of FIG. 4 can be performed by embodiments different from FIG. 1.

At operation 410, the cache service 110 receives a request for an asset. The request may be sent from a different process on the computing device 100. For example, in the case the computing device 100 is a CDN node, the request may be sent by a web server for a web asset that has been requested by a client computing device. The cache service 110 processes the request including determining whether the asset is available in the permanent cache 120 at operation 415. The cache service 110 may create a cache key and check the permanent cache 120 for the asset. If the asset is available in the permanent cache, then flow moves to operation 420 where the cache service 110 reads the asset from the permanent cache 120, and then the cache service 110 responds to the request with the asset read from the permanent cache 120 at operation 425. If another request is received for the asset, flow starts over at operation 410.

If the asset is not available in the permanent cache (a cache miss has occurred for the permanent cache), then flow moves to operation 430 where the cache service 110 checks whether the asset is available in the transient cache 130. If the asset is not available in the transient cache 130 (a cache miss has also occurred for the transient cache 130), then flow moves to operation 435. At operation 435, the cache service 110 retrieves the asset from the source of the asset (e.g., the asset source 160). In the example where the computing device 100 is a CDN node, the cache service 110 may make a request (e.g., an HTTP(S) request) directed at the URL of the requested asset to retrieve the asset, where the asset source 160 may be the origin source of the asset. In the example where the computing device 100 is a database cache device, the cache service 110 may make a database query to the asset source 160 to retrieve the asset. After retrieving the asset, the asset is written to the transient cache 130 at operation 440. The asset is not at this time written to the permanent cache 120. Next, at operation 445, the cache service 110 responds to the request with the asset. If another request is received for the asset, flow starts over at operation 410. The operations 440 and 445 may be swapped. For instance, the cache service 110 may respond to the request with the asset before writing the asset to the transient cache 130.

If the asset is available in the transient cache 130 (a cache hit in the transient cache 130), then flow moves to operation 450 where the cache service 110 reads the asset from the transient cache 130. Next, at operation 455, the cache service 110 responds to the request with the asset. Next, at operation 460, the cache service 110 increments a cache hit counter for the asset that represents the number of cache hits for the asset from the transient cache 130 and/or the permanent cache 120. The operations 455 and 460 may be swapped.

The asset will not be written to the permanent cache 120 until a predefined set of one or more criteria is met. At operation 465, the cache service 110 determines whether the cache promotion criteria are satisfied. In an embodiment, the one or more criteria is based on the number of cache hits for the asset (the hit threshold), the TTL of the asset, the size of the asset, the content type of the asset, and/or the type of account to which the asset belongs. In a specific example, the hit threshold may be one or more. Thus, in an embodiment, after the first cache hit in the transient cache 130 for the asset, the asset is written to the permanent cache 120 (assuming that the other criteria, if any, is also satisfied). If the cache promotion criteria are not satisfied, then flow moves to operation 475 where the operations end (the asset remains in the transient cache 130). If the cache promotion criteria are satisfied, then flow moves to operation 470 where the cache service 110 writes the asset to the permanent cache 120. The asset may be copied from the transient cache 130 to the permanent cache 120, or it may be moved to the permanent cache 120. The asset may not be deleted from the transient cache 130 immediately, which allows the asset to be read from the transient cache 130 for concurrent requests. However, the asset may be moved to the end of an LRU queue and marked inactive and subject to removal. In an embodiment, the write to the permanent cache 120 is written through the disk cache of the operating system of the computing device 100. For instance, in the case of a Linux operating system, the write is through page cache and the kernel flushes the write to the permanent cache 120.

In an embodiment, an asset that has been promoted to the permanent cache 120 may be subject to being demoted back to the transient cache 130 if certain one or more criteria are met as previously described herein. In such an embodiment, flow moves from operation 470 to operation 480 where the cache service 110 determines whether a set of one or more cache demotion criteria has been satisfied before the asset is removed from the permanent cache 120. The cache demotion criteria may be based on the number of cache hits for the asset in the permanent cache 120, the size of the asset, the TTL of the asset, and/or the content type of the asset, as previously described herein. The cache demotion may be done actively or passively (e.g., during eviction). In an embodiment, during the process to evict the asset (which may be done according to a cache eviction policy such as an LFU or LRU policy), the asset is demoted to the transient cache 130 and optionally only if the set of criteria is met. If the cache demotion criteria are met, then the cache service 110 causes the asset to be written to the transient cache 130 at operation 485. The asset may not be deleted from the permanent cache 120 immediately, which allows the asset to be read from the permanent cache 120 for concurrent requests. However, the asset may be moved to the end of an LRU queue and marked inactive and subject to removal. If the cache demotion criteria are not met, then the cache service 110 causes the asset to be removed from the permanent cache 120 at operation 490. After the asset is removed from the permanent cache 120, and assuming that the asset is not written to the transient cache 130 (or to another cache or storage available to the computing device), the asset would need to be retrieved from the asset source if the computing device received another request for the asset. For instance, in the case of a CDN, the computing device may need to retrieve the asset again from the origin server.

Figure 5:
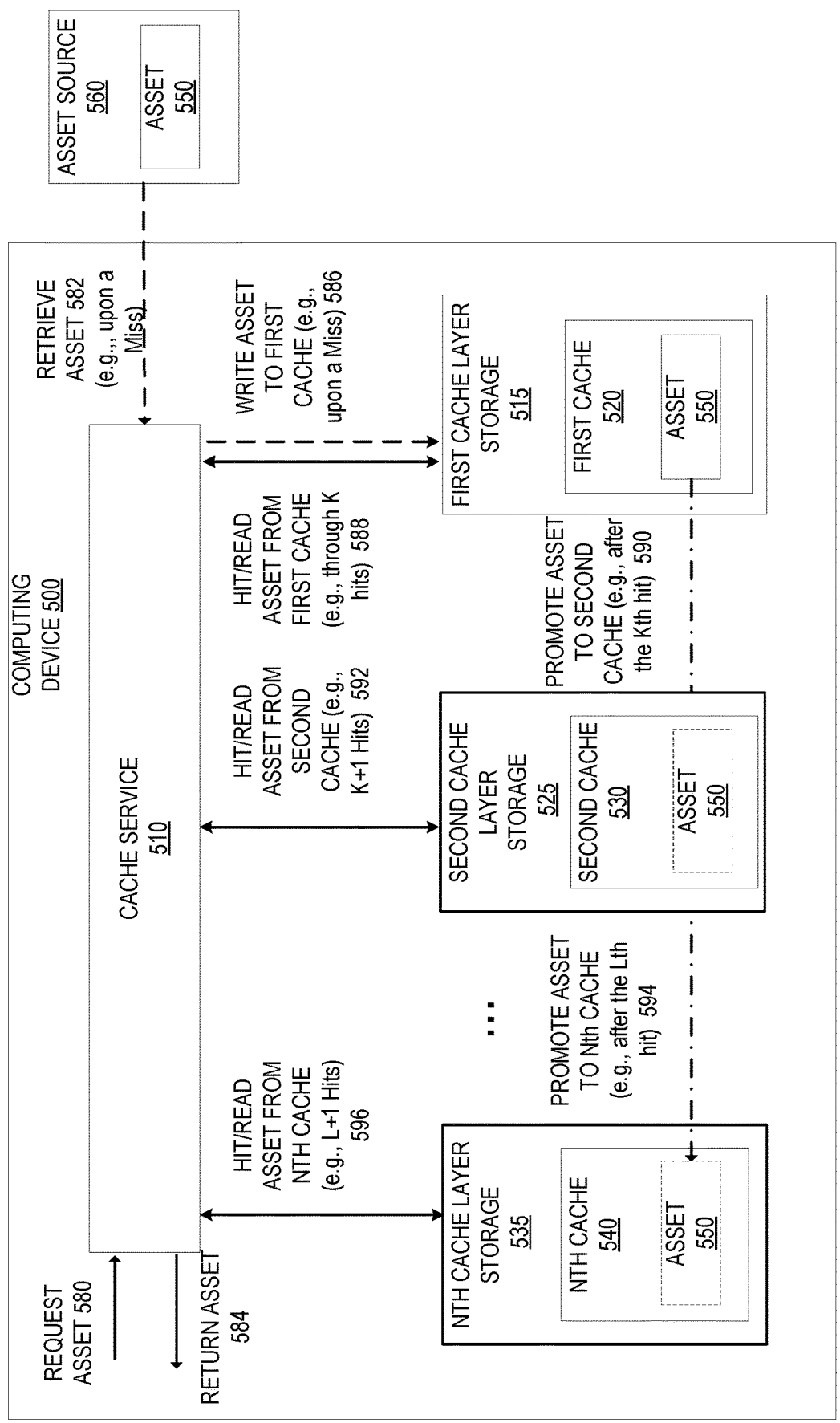
FIG. 5 illustrates an example for an improved caching system that uses multiple caches according to an embodiment.

Although embodiments have been described that have two caches (a transient cache and a permanent cache), in another embodiment there are three or more caches. FIG. 5 illustrates an example for an improved caching system that uses multiple caches according to an embodiment. The computing device 500 is similar to the computing device 100 but includes N cache layers, where N is at least 3. The computing device includes the cache service 510, the first cache layer storage 515 that includes the first cache 520, the second cache layer storage 525 that includes the second cache 530, and the Nth cache layer storage 535 that includes the Nth cache 540. The computing device 500 also includes other components that are not illustrated (e.g., processor(s), an operating system, input/output control, etc.) to simplify understanding of the embodiment. In a specific example, the computing device 500 is a node in a content delivery network (CDN).

The cache service 510 is similar to the cache service 110 but also manages the caching and promotion of assets between the N caches. The N cache storage layers may, in an embodiment, have progressively different write performance characteristics. For instance, a write operation to the first cache layer storage 515 may be faster and/or not cause as much wear on the storage as compared to a write operation to the second cache layer storage 525, a write operation to the second cache layer storage 525 may be faster and/or not cause as much wear on the storage as compared to a write operation to the next layer storage (e.g., the Nth cache layer storage 535), and so on. The first cache layer storage 515 may have a smaller capacity than the second cache layer storage 525 that may itself have a smaller capacity than the next cache layer storage (e.g., the Nth cache layer storage 535), and so on. The cache layer storages may be any combination of persistent and non-persistent storage. However, it is expected that assets are stored in the last cache layer storage (the Nth cache layer storage 535) for longer periods than stored in the other cache layer storage. Cache eviction policies may apply to each of the caches in FIG. 5.

Upon a cache miss, the cache service 510 causes the asset to be retrieved from the asset source 560 and written to the first cache 520 in the first cache layer storage 515 and at least not initially to the other caches (e.g., the second cache 530 through the Nth cache 540). The cache service 510 causes the asset to be written to the second cache 530 only if certain one or more criteria are met, such as if the asset is read from the first cache 520 a certain number of times prior to the asset being evicted from the first cache 520 (e.g., the asset is a popular asset). If the asset is an unpopular asset, the asset will be evicted from the first cache 520 without being written to the second cache 530. After writing the asset to the second cache 530, the cache service 510 will cause the asset to be read from the second cache 530 (and not from the first cache 520).

The cache service 510 receives a request for a cacheable asset at operation 580. This request is like the request received at operation 180. The cache service 510 processes the request including determining whether the requested asset is cached in any of the caches 520-540. Assuming that the requested asset is not available in these caches (there is a cache miss), the cache service 510 causes the requested asset to be retrieved at operation 582 from the asset source 560. In another example, instead of pulling the asset from the asset source 560 after a cache miss, the asset may be pre-fetched by the cache service 510 (e.g., retrieved prior to receiving a request for that asset) or pushed by the asset source 560 to the computing device 500. By way of example in FIG. 5, the asset source 560 includes the asset 550. The asset source 560 is a source of data for the asset like the asset source 160.

The cache service 510 causes the asset to be written to the first cache 520 at operation 586 (e.g., upon a miss and retrieval of the asset from the asset source 560). As shown in FIG. 5, the asset 550 is written to the first cache 520. The cache service 510 may also set a cache hit counter for the asset that represents the number of cache hits for the asset. The cache service 510 responds to the request by returning the asset at operation 584. If the cache service 510 receives another request for the same asset prior to that asset being evicted from the first cache 520 (and prior to the asset being promoted to the second cache 530), the cache service 510 reads the asset from the first cache 520 at operation 588. The cache service 510 reads the asset from the first cache 520 (if not evicted) until the asset is promoted to the second cache 530. The cache service 510 may then read the asset from the second cache 530.

The cache service 510 promotes the asset from the first cache 520 to the second cache 530 at operation 590 if a predefined set of one or more criteria is met. In an embodiment, the one or more criteria is based on the number of cache hits K for the asset in the first cache 520, where K is one or more. In a specific example, K is one; meaning that the first cache hit for the asset in the first cache 520 will cause the asset to be written to the second cache 530; and the next request for the asset may be read from the second cache 530. In another embodiment, the criteria include the number of cache hits, the time to live (TTL) of the asset, the size of the asset, the content type of the asset, and/or the type of account to which the asset belongs. For example, the asset may not be written to the second cache 530 even if the number of cache hits meets the certain number if the TTL is below a threshold (e.g., a few seconds). As shown in FIG. 5, the asset 550 is written to the second cache 530. If the cache service 510 receives another request for the same asset prior to that asset being evicted from the second cache 530 or the asset being promoted to the next layer cache (e.g., the Nth cache 540), the cache service 510 reads the asset from the second cache 530 at operation 592. The cache service 510 promotes the asset from the first cache 520 to the second cache 530 at operation 590 if a predefined set of one or more criteria is met.

The cache service 510 promotes the asset from the second cache 530 to the next higher layer cache (e.g., the Nth cache 540) at operation 594 if a predefined set of one or more criteria is met. In an embodiment, the one or more criteria is based on the number of cache hits L for the asset in the second cache 530, where L is one or more. In another embodiment, the criteria include the number of cache hits and the time to live (TTL) of the asset. As shown in FIG. 5, the asset 550 is written to the Nth cache 540. If the cache service 510 receives another request for the same asset prior to that asset being evicted from the Nth cache 540, the cache service 510 reads the asset from the Nth cache 540 at operation 596.

In an embodiment, to promote the asset to a different layer cache, the asset is copied from the lower layer cache to the next layer cache. The copy operation may be in its own thread. The asset may not be deleted from the lower layer cache immediately, which allows the asset to be read from the lower layer cache for concurrent requests. However, the asset may be moved to the end of an LRU queue and marked inactive and subject to removal. In an embodiment, the write to each upper layer cache is written through the disk cache of the operating system of the computing device 500. For instance, in the case of a Linux operating system, the write is through page cache and the kernel flushes the write to the next layer cache.

Although not illustrated in FIG. 5, in an embodiment, an asset that has been promoted to a higher level cache may be demoted to a lower level cache, which can be done actively or passively based on a set of one or more criteria as previously described. For instance, an asset in the Nth cache 540 may be demoted to the next lower layer cache (e.g., the second cache 530), and an asset in the second cache 530 may be demoted to the first cache 520. In an embodiment, an asset does not need to be in the highest layer cache (e.g., the Nth cache 540) before being demoted to a lower layer cache. For instance, an asset that is in the second cache 530 may be demoted to the first cache 520 prior to that asset being promoted from the second cache 530 to a higher layer cache.

Although FIG. 5 shows an embodiment where the first cache layer storage 515, the second cache layer storage 525, and the Nth cache layer storage 535 are part of the same computing device, in another embodiment one or more of these cache layer storages may be part of different computing devices. For example, one or more of these cache layer storages may be located in different computing devices of the same data center.

The techniques shown in the figures can be implemented using code and data stored and executed on one or more electronic devices (e.g., computing device). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

In the preceding description, numerous specific details such are set forth to provide a more thorough understanding. In other instances, control structures, gate level circuits and full software instruction sequences have not been shown in detail to not obscure understanding. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the preceding description and the claims, the terms "coupled" and "connected," along with their derivatives, may be used. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A computing device, comprising:
   a volatile memory to include a first cache;
   a non-volatile storage to include a second cache; and
   a cache service that is configured to perform the following operations:
      responsive to a cache miss in the first cache and the second cache for an asset, retrieve that asset from a remote asset source and write that asset to the first cache and not the second cache,
      read the asset from the first cache responsive to requests for the asset until the asset is evicted from the first cache or until the asset is promoted to the second cache,
      promote the asset to the second cache upon determining that a set of one or more criteria are satisfied, wherein the set of one or more criteria includes a predefined number of cache hits for the asset when it is in the first cache, and
      read the asset from the second cache responsive to requests for the asset until the asset is evicted from the second cache.

2. The computing device of claim 1, wherein the set of one or more criteria further includes a time to live (TTL), wherein the asset is not promoted to the second cache unless the TTL is above a threshold value.

3. The computing device of claim 1, wherein the volatile memory is DRAM, and the non-volatile storage is a solid-state drive (SSD).

4. The computing device of claim 1, wherein the computing device is a node in a content delivery network (CDN), wherein the asset is a network asset, and wherein the remote asset source is an origin for the asset.

5. The computing device of claim 1, wherein the predefined number of cache hits is one or more.

6. The computing device of claim 1, wherein the cache service is further configured to perform the following operation:
- demote the asset from the second cache to the first cache upon determining that a set of one or more demotion criteria are satisfied.

7. A method in a computing device, comprising:
- receiving a first request for a first asset;
- determining that the first asset is not in a first cache in a first cache storage and also not in a second cache in a second cache storage available to the computing device;
- retrieving the first asset from a first asset source;
- writing the retrieved first asset to the first cache, wherein write operations to the first cache in the first cache storage cause less wear on the first cache storage compared to wear on the second cache storage caused by write operations to the second cache in the second cache storage;
- responding to the first request with the first asset;
- receiving a set of one or more second requests for the first asset that are subsequent to the first request;
- determining, for each of the set of one or more second requests for the first asset that are subsequent to the first request, that the first asset is available in the first cache;
- reading, for each of the set of one or more second requests for the first asset that are subsequent to the first request, the first asset from the first cache;
- responding to each of the set of one or more second requests with the first asset read from the first cache;
- determining that a set of one or more criteria are satisfied for writing the first asset to the second cache in the second cache storage, wherein the set of one or more criteria include a number of reads of the first asset from the first cache that equals a number of the set of one or more second requests for the first asset that are subsequent to the first request, and responsive to this determination, writing the first asset to the second cache in the second cache storage;
- after writing the first asset to the second cache in the second cache storage, receiving a third request for the first asset;
- reading the first asset from the second cache for the third request; and
- responding to the third request with the first asset retrieved from the second cache.

8. The method of claim 7, further comprising:
- removing the first asset from the second cache according to a cache eviction policy.

9. The method of claim 7, further comprising:
- determining that a set of one or more demotion criteria are satisfied for writing the first asset to the first cache in the first cache storage, and responsive to this determination, writing the first asset to the first cache in the first cache storage.

10. The method of claim 7, further comprising:
- receiving a fourth request for a second asset;
- determining that the second asset is not in the first cache and also not in the second cache;
- retrieving the second asset from a second asset source;
- writing the retrieved second asset to the first cache;
- responding to the fourth request with the second asset; and
- evicting the second asset from the first cache according to a cache eviction policy and not writing the second asset to the second cache, wherein the second asset is evicted at least in part as a result of not reading the second asset from the first cache because of not receiving a subsequent request for the second asset prior to cache eviction.

11. The method of claim 7, wherein the set of one or more criteria further includes a time to live (TTL) for the first asset, wherein the asset is not written to the second cache unless the TTL is above a threshold value.

12. The method of claim 7, wherein the first cache storage is volatile memory, and wherein the second cache storage is a solid-state drive (SSD).

13. The method of claim 7, wherein the computing device is a node in a content delivery network (CDN), wherein the first asset is a network asset, and wherein the first asset source is an origin for the first asset.

14. The method of claim 7, wherein the number of reads of the first asset is one.

15. A non-transitory machine-readable storage medium that provides instructions that, when executed by a processor of a computing device, will cause the computing device to perform operations, comprising:
- receiving a first request for a first asset;
- determining that the first asset is not in a first cache in a first cache storage and also not in a second cache in a second cache storage available to the computing device;
- retrieving the first asset from a first asset source;
- writing the retrieved first asset to the first cache, wherein write operations to the first cache in the first cache storage cause less wear on the first cache storage compared to wear on the second cache storage caused by write operations to the second cache in the second cache storage;
- responding to the first request with the first asset;
- receiving a set of one or more second requests for the first asset that are subsequent to the first request;
- determining, for each of the set of one or more second requests for the first asset that are subsequent to the first request, that the first asset is available in the first cache;
- reading, for each of the set of one or more second requests for the first asset that are subsequent to the first request, the first asset from the first cache;
- responding to each of the set of one or more second requests with the first asset read from the first cache;
- determining that a set of one or more criteria are satisfied for writing the first asset to the second cache in the second cache storage, wherein the set of one or more criteria include a number of reads of the first asset from the first cache that equals a number of the set of one or more second requests for the first asset that are subsequent to the first request, and responsive to this determination, writing the first asset to the second cache in the second cache storage;
- after writing the first asset to the second cache in the second cache storage, receiving a third request for the first asset;
- reading the first asset from the second cache for the third request; and
- responding to the third request with the first asset retrieved from the second cache.

16. The non-transitory machine-readable storage medium of claim 15, wherein the operations further comprise:
- removing the first asset from the second cache according to a cache eviction policy.

17. The non-transitory machine-readable storage medium of claim 15, wherein the operations further comprise:
- determining that a set of one or more demotion criteria are satisfied for writing the first asset to the first cache in the first cache storage, and responsive to this determination, writing the first asset to the first cache in the first cache storage.

18. The non-transitory machine-readable storage medium of claim 15, wherein the operations further comprise:
receiving a fourth request for a second asset;
determining that the second asset is not in the first cache and also not in the second cache;
retrieving the second asset from a second asset source;
writing the retrieved second asset to the first cache;
responding to the fourth request with the second asset; and
evicting the second asset from the first cache according to a cache eviction policy and not writing the second asset to the second cache, wherein the second asset is evicted at least in part as a result of not reading the second asset from the first cache because of not receiving a subsequent request for the second asset prior to cache eviction.

19. The non-transitory machine-readable storage medium of claim 15, wherein the set of one or more criteria further includes a time to live (TTL) for the first asset, wherein the asset is not written to the second cache unless the TTL is above a threshold value.

20. The non-transitory machine-readable storage medium of claim 15, wherein the first cache storage is volatile memory, and wherein the second cache storage is a solid-state drive (SSD).

21. The non-transitory machine-readable storage medium of claim 15, wherein the computing device is a node in a content delivery network (CDN), wherein the first asset is a network asset, and wherein the first asset source is an origin for the first asset.

22. The non-transitory machine-readable storage medium of claim 15, wherein the number of reads of the first asset is one.

* * * * *